(12) United States Patent
Herbert (10) Patent No.: US 9,712,062 B2
(45) Date of Patent: Jul. 18, 2017

(54) SYMMETRICAL POWER CONVERTER

(71) Applicant: Edward Herbert, Canton, CT (US)

(72) Inventor: Edward Herbert, Canton, CT (US)

( * ) Notice: Subject to any disclaimer, the term of this patent is extended or adjusted under 35 U.S.C. 154(b) by 112 days.

(21) Appl. No.: 14/706,847

(22) Filed: May 7, 2015

(65) Prior Publication Data

US 2015/0326132 A1  Nov. 12, 2015

Related U.S. Application Data

(63) Continuation-in-part of application No. 61/990,015, filed on May 7, 2014.

(51) Int. Cl.
*H02M 3/335* (2006.01)
*H01F 38/00* (2006.01)
*H01F 38/02* (2006.01)

(52) U.S. Cl.
CPC ............ *H02M 3/335* (2013.01); *H01F 38/00* (2013.01); *H02M 3/33546* (2013.01); *H01F 2038/006* (2013.01); *H01F 2038/026* (2013.01)

(58) Field of Classification Search
CPC ... H02M 3/33546; H02M 3/335; H01F 38/00; H01F 2038/006; H01F 2038/026
See application file for complete search history.

(56) References Cited

U.S. PATENT DOCUMENTS

| | | | |
|---|---|---|---|
| 6,191,676 B1 * | 2/2001 | Gabor | H02M 1/4225 336/160 |
| 6,278,266 B1 * | 8/2001 | Glasband | H01F 19/04 323/355 |
| 6,459,213 B1 * | 10/2002 | Nilssen | H02M 7/53832 315/209 R |

(Continued)

*Primary Examiner* — Fred E Finch, III
*Assistant Examiner* — Demetries A Gibson (57) ABSTRACT

A switched-capacitor circuit has two capacitors and two MOSFETs that cross-couple the capacitors, connecting the anode of one to the cathode of the other, and vice-versa. When either MOSFET is on, the capacitors are in series; the order alternates as the MOSFETs alternate. A reversing cyclical voltage suitable as a primary drive for a transformer is generated. If the MOSFETs alternate with no dead-time, a square-wave excitation is generated. With off-time, a pwm excitation is generate. Charge is maintained on the switched-capacitors using a symmetrical common-mode inductor. A bifilar winding is center-tap as its input, and the ends of the bifilar winding are connected to the capacitors. The capacitors are effectively in parallel. Because the charging current flows and returns through each leg of the inductor equally, it cannot magnetize the inductor core or cause any flux change. Because any voltages induced in the windings are common-mode, flux change in the core does not affect the charging current. The ac voltage generated when the capacitors switch is across the full inductor. Not only does the inductance attenuate any noise, the center-tap is between equal and opposite negative and positive voltages, which cancel. There is very little noise at the input. The circuit is reciprocal, so it can be used to rectify a transformer output. Two can be used as a bi-directional transformer isolated power converter. Several modules using 1 to 1 transformers can be stacked for a power converter having a higher ratio of input to output voltage.

6 Claims, 10 Drawing Sheets

(56) References Cited

U.S. PATENT DOCUMENTS

| | | | | |
|---|---|---|---|---|
| 8,749,156 | B2* | 6/2014 | Cheng | H05B 41/28 |
| | | | | 315/210 |
| 9,030,843 | B1* | 5/2015 | Herbert | H02M 3/33561 |
| | | | | 363/17 |
| 2009/0200965 | A1* | 8/2009 | King | H05B 41/282 |
| | | | | 315/307 |
| 2014/0145615 | A1* | 5/2014 | Goscha | H05B 41/2806 |
| | | | | 315/85 |
| 2014/0368109 | A1* | 12/2014 | Goscha | H01J 61/28 |
| | | | | 315/34 |
| 2015/0129755 | A1* | 5/2015 | Hiley | G01N 27/622 |
| | | | | 250/281 |

* cited by examiner

SYMMETRICAL POWER CONVERTER

CROSS REFERENCE TO RELATED APPLICATIONS

This application is a continuation in part of a provisional patent application U.S. 61/990,015 entitled "Symmetrical Transformers," filed May 7, 2014. This provisional patent application is incorporated herein by reference.

BACKGROUND OF THE INVENTION

This invention relates to power converters, and more particularly to isolated dc to dc power converters, though an alternative embodiment of the invention is adapted for isolated ac to ac power conversion.

Figure 18:
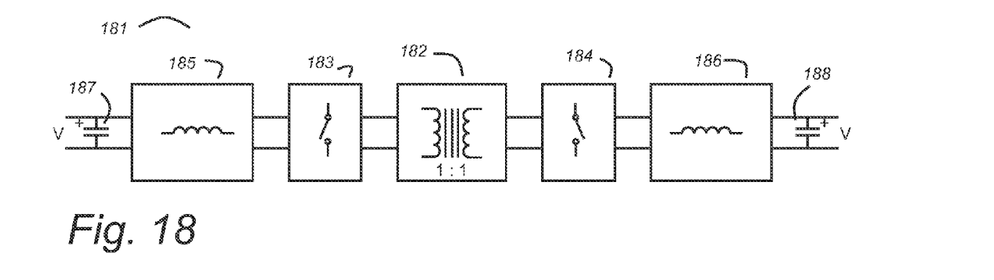
FIG. 18 shows a block diagram of the parts for the "solid-state dc-dc transformer" of FIG. 16.

A generic block diagram of a representative isolated dc to dc power converter 181 is shown in FIG. 18. In the center is a high frequency transformer 182. As is the nature of most transformers, the excitation is ac, and that is provided by a switching network 183. The output of the transformer also is ac, requiring rectification to provide a dc output. The rectifier may be a synchronous rectifier 184. Both the input switching network 183 and the rectifier 184 tend to generate significant electrical noise, so input and output inductors 185 and 186 usually are needed. Very likely, there will be an input filter capacitor 187 and an output filter capacitor 188.

The symmetrical power converter builds on the teachings of the symmetrical push-pull transformer from 1990, best explained by reference to "Design and Application of Matrix Transformers and Symmetrical Converters," a tutorial for a seminar presented at the Fifth International High Frequency Power Conversion Conference '90 in Santa Clara, Calif., on May 11, 1990. The symmetrical push-pull had limited commercial success, but it is quite difficult to provide suitable drive for its semiconductor switches.

SUMMARY OF THE INVENTION

Figure 1:
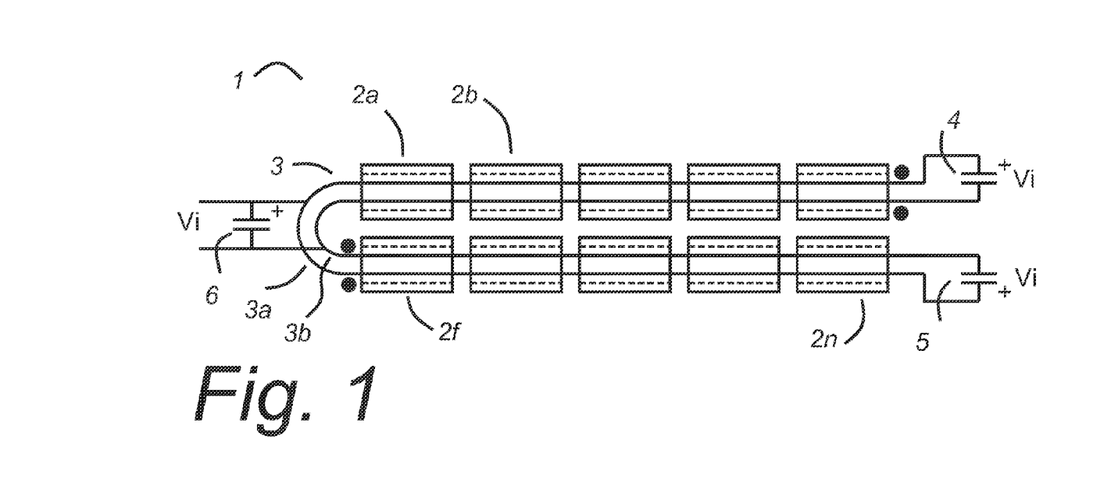
FIG. 1 shows a symmetrical inductor with its common-mode capacitors and an input capacitor.
Figure 6:
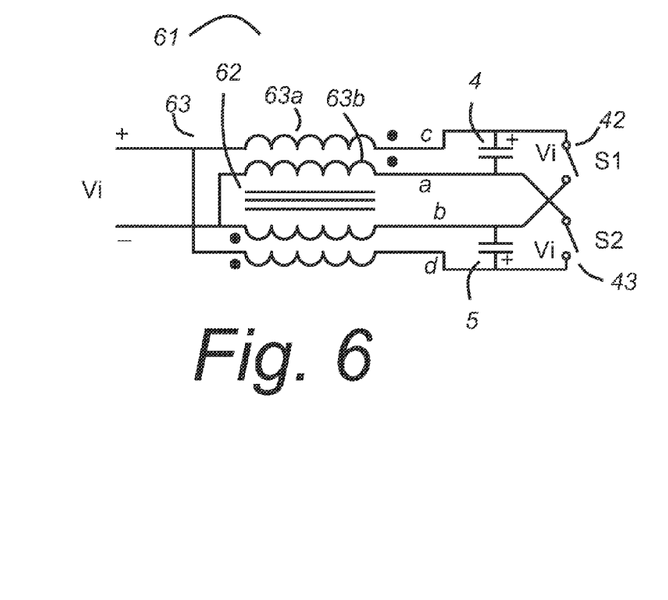
FIG. 6 shows a generic symmetrical inductor with capacitors and switches having a common magnetic core.
Figure 7:
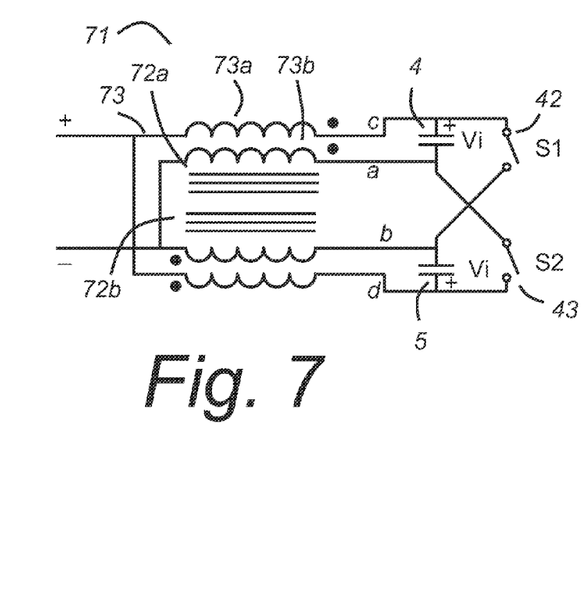
FIG. 7 shows a generic symmetrical inductor with capacitors and switches having two magnetic cores.

The linchpin of the symmetrical power converter is the symmetrical inductor. It is called "symmetrical" because it uses equal and opposite voltages on its output that are cancelling at the input. The symmetrical voltages also tend to cancel currents conducted through stray capacitance. A representative symmetrical inductor is shown in FIG. 1, and more generic versions are shown in FIGS. 6 and 7.

Figure 8A:
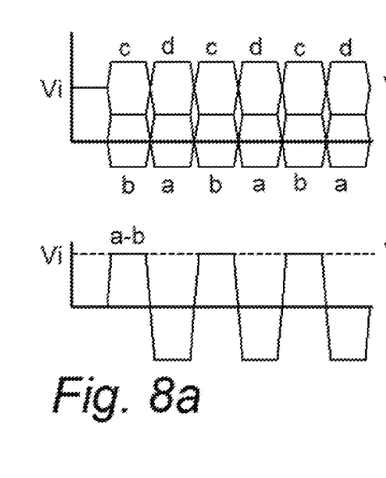
FIGS. 8a and 8b show representative waveforms, with reference to nodes a, b, c and d of FIG. 4.
Figure 8B:
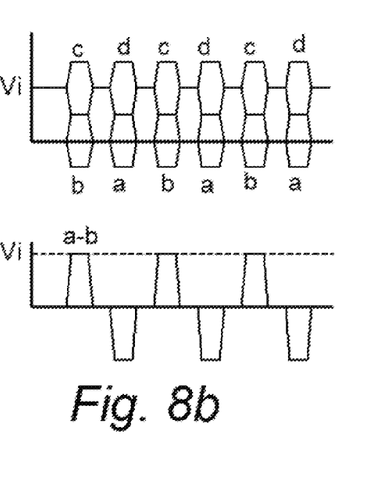

The symmetrical voltages on the output of the symmetrical inductor are generated with a switched-capacitor circuit, which may be operated to generate complementary square-wave voltages or they may be operated in a pulse-width-modulated (pwm) mode to generate complementary lower duty-ratio rectangular-wave excitation, as can be seen in FIGS. 8a and 8b.

There are nodes on the switch-capacitor circuit that provide a suitable excitation for a high frequency transformer. In the preferred embodiment of the invention, the transformer has a single turn primary and a single turn secondary arranged as coaxial conductors for minimal leakage inductance and optimum coupling. (An alternative embodiment has a split secondary so that the dc output can be complementary voltages of opposite polarity.) The single turn transformer has several advantages, one being very simple construction, however a more important consideration is that the inter-winding capacitance becomes an advantage, not a problem, facilitating much higher frequency operation.

Using single-turn windings constrains the transformer itself to be 1 to 1 (or 1 to 1 to 1, with a split secondary). Lower duty-ratio can be used to effect a voltage reduction, but it is preferred to use a modular design, especially for larger equivalent turns-ratios. Each power converter module has a complete power converter circuit as shown in FIG. 18, and it has suitable isolation within the transformer to withstand the highest applied voltage differential, input to output. In the simplest embodiment of the modular power converter, n modules have their inputs in series and their outputs in parallel, so the effective turns ratio is n to 1. Transformers are reciprocal, and so can be the symmetrical power converter, by designing the switching circuits for bi-directional current flow. Operated in reverse, this scheme provides a step up in voltage.

The individual modules can be turned on or off. By designing a symmetrical power converter with more modules than needed for a nominal turns-ratio, the effective turns-ratio becomes variable by switching one or more module in or out of the circuit, allowing for voltage regulation. With a very low current or zero-current output, individual modules can be operated at a low duty-ratio to keep the circuit alive and maintain regulation while having a very low magnetization current and losses A preferred operating mode is for the modules to be controlled as independent dual-active-bridge (dab) converters. This gives very good control of the current and some ability to control the voltage, for voltage regulation over a small range.

The basic symmetrical inductor can operate in either direction with either polarity of voltage. If ac switches are used, such as back-to-back MOSFETs, as an example, not a limitation, then the symmetrical power converter can operate with either polarity, or with alternating polarity as an isolated ac to ac power converter.

The ac to ac power converter of this invention may find application as a simplified "solid state transformer." While it can be used for small power converters in the scale of tens to hundreds of watts, it also scales well to hundreds of kilowatts or megawatts.

A problem with utility scale transformers is that they are huge, very expensive, and have a long production and replacement cycle. If one is damaged or destroyed in the field, it could take many months to replace it. A comparable "solid state transformer" is inherently smaller due to its much higher operating frequency. More important for consideration of replacement time, a "solid state transformer" built using modules of this invention can be delivered by delivery truck and assembled on-site with a few days.

DETAILED DESCRIPTION

FIG. 1 shows a symmetrical inductor 1 comprising n magnetic cores 2a through 2n, shown as an example, not a limitation as ten toroidal cores with a bifilar inductor winding 3 comprising two wires 3a and 3b. The inductor winding 3 is particularly easy to make, being simply two "U" shaped wires with center-tapped terminations for an input voltage Vi. Common-mode capacitors 4 and 5 are shown on the output of the inductor, and there may be an input capacitor 6 on the input. It can be seen that the three capacitors 4, 5 and 6 are effectively in parallel, therefore the voltage will always be the same on all of them, a key characteristic of the symmetrical inductor circuits.

In connecting from the input voltage Vi to the common-mode capacitors 4 and 5, the circuit passes through the cores 2a through 2n in opposite directions so that the currents cancel. The currents that charge the common-mode capacitors 4 and 5 do not affect the flux in the magnetic cores 2a through 2n, and nothing that the flux in the cores 2a through 2n does can affect the charging current for the common-mode capacitors 4 and 5.

Figure 2:
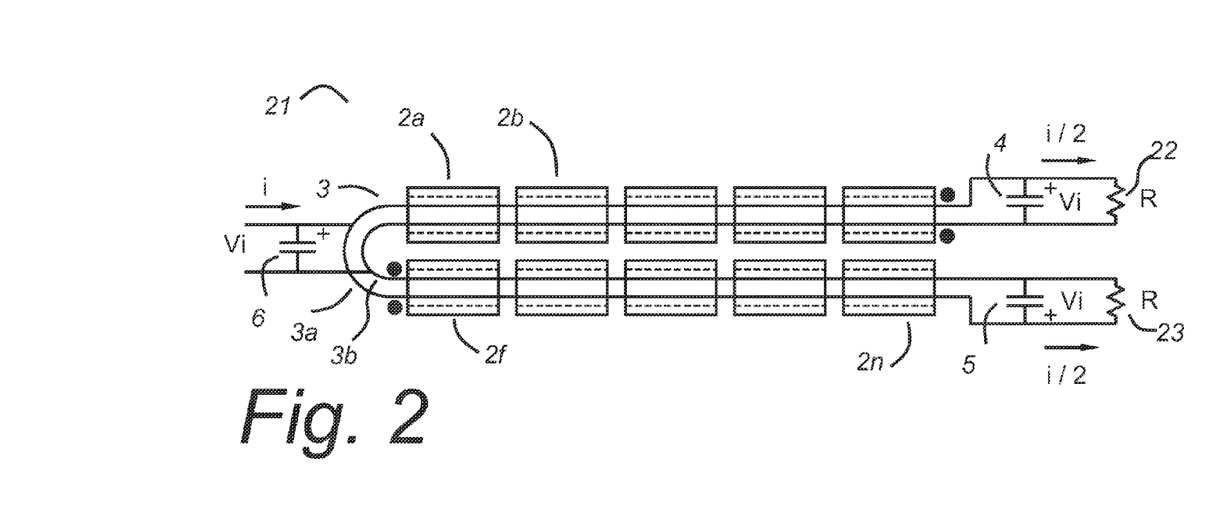
FIG. 2 is the symmetrical inductor of FIG. 1, with load resistors

FIG. 2 shows that resistors 22 and 23 can be added to the symmetrical inductor of FIG. 1, and they conduct current and dissipate power as if they were connected directly to the input voltage Vi. The currents cannot change the flux in the cores 2a through 2n, and flux changes in the cores do not affect the currents that charge or discharge the common mode capacitors 4 and 5.

Figure 3:
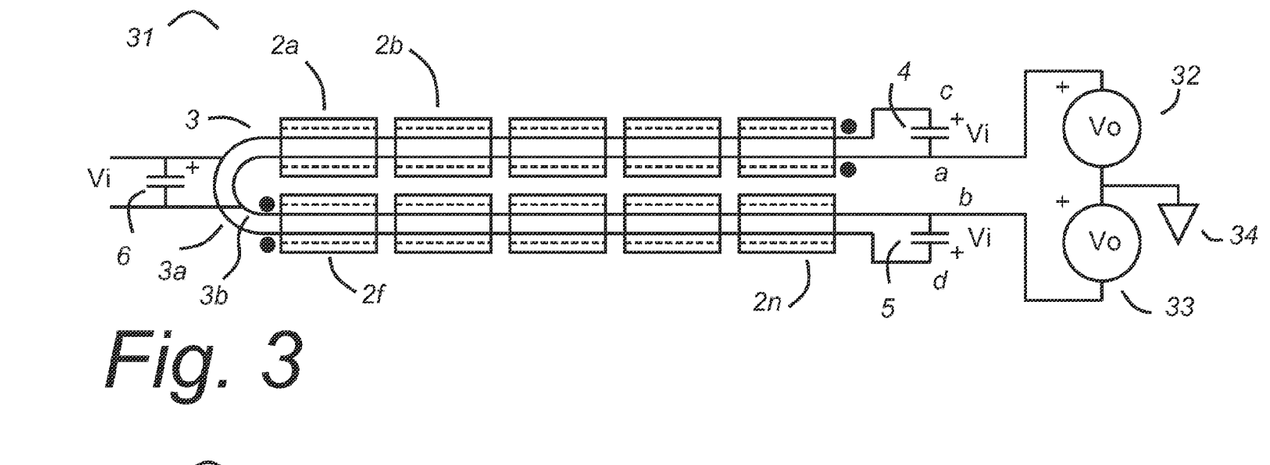
FIG. 3 is the symmetrical inductor of FIG. 1 with symmetrical voltage sources applied to its output.

FIG. 3 shows that symmetrical voltage sources 32 and 33 can be connected to the output of the symmetrical inductor 1 of FIG. 1. A ground 34 is shown for reference. If applied as a direct voltage for too long duration, the voltage sources 32 and 33 would saturate the magnetic cores 2a through 2n, as in any inductor, but if the voltage sources 32 and 33 are ac voltages of sufficiently high frequency, the combined inductance of the magnetic cores 2a through 2n will limit the flow of current to the magnetization current of the magnetic cores 2a through 2n, as in any inductor.

A feature of the symmetrical inductor 31 is that for any symmetrical voltage applied on its output, the input terminals are at the center point of cumulative inductance of the magnetic cores 2a through 2n so symmetrical voltages cancel and no noise appears on the input terminals. This is true regardless of the magnitude of the input voltage Vi and regardless of the magnitude of the symmetrical voltage sources 32 and 33, as long as the magnetic cores 2a through 2n do not saturate.

Figure 4:
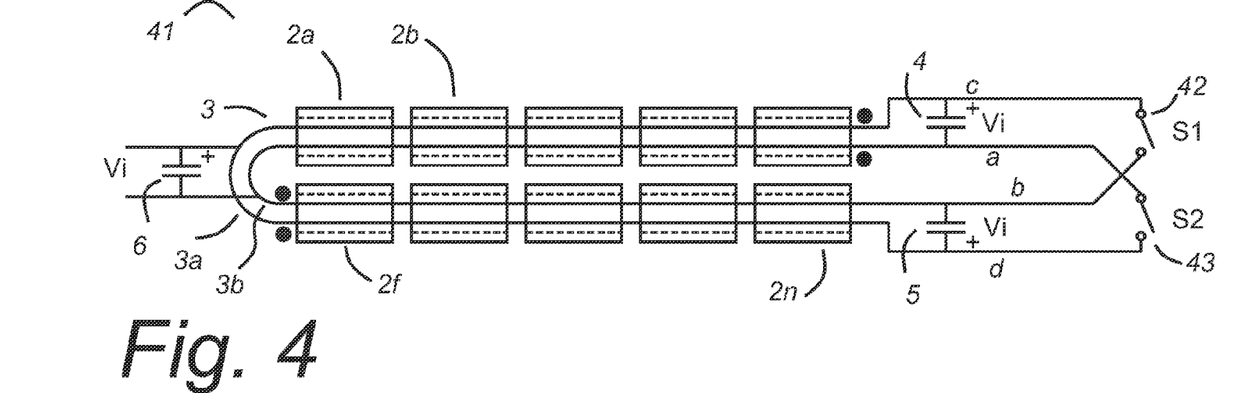
FIG. 4 is the symmetrical inductor of FIG. 1 with symmetrical switches.

FIG. 4 shows symmetrical switches 42 and 43 can be applied to the output of the symmetrical inductor 1 of FIG. 1. In a practical power converter, the switches 42 and 43 may be solid state switches, and methods of driving them will be shown. Reference nodes a, b, c and d are shown for future reference of the voltage thereon.

Figure 5A:
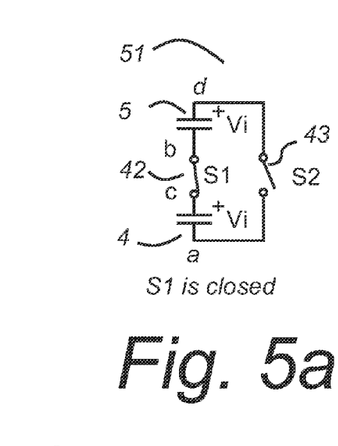
FIGS. 5a, 5b and 5c show the effective connections of the common-mode capacitors of the symmetrical inductor of FIG. 4 for three states of the switches, with reference to nodes a, b, c and d of FIG. 4.
Figure 5B:
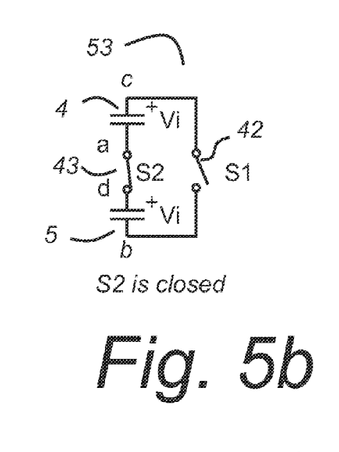
Figure 5C:
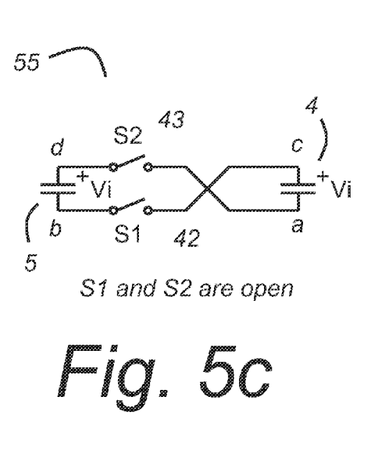

FIGS. 5a, 5b and 5c show that the common-mode capacitors 4 and 5 of FIG. 4 are effectively placed in series if either switch S1 42 or switch S2 43 is closed. FIG. 5a shows the state with switch S1 42 closed; FIG. 5b shows the state with switch S2 43 closed; and FIG. 5c shows the state with both switches open. Note that the voltage from the nodes a to b reverses polarity, as does the voltage from nodes c to d. Either set of nodes, a and b or c and d have suitable voltage waveforms to drive a transformer, and both sets of nodes can be used to excite a transformer with a split primary.

FIG. 8 shows the resulting waveforms as the switches S1 42 and S2 43 are operated. In FIG. 8a, there is an initial period when both switches are open, then they alternate with minimal dead-time. The significance is that between nodes a and b, there is generated a square-wave voltage suitable for exciting a transformer. The same voltage occurs between nodes c and d. FIG. 8b is similar, but shows the case were the switches are operated with off-time between the on-times, for pulse-width-modulated (pwm) operation.

As will be explained, there are advantages to making the symmetrical inductor 1 of FIGS. 1 through 4 of multiple small cores, but FIG. 6 shows that a symmetrical inductor 61 can be wound on a single magnetic core 62. The bifilar winding 63 comprises two wires 63a and 63b, each center-tapped at the input voltage Vi. The common-mode capacitors 4 and 5 and the symmetrical switches 42 and 43 connect just as they do in FIG. 4, and operation is similar.

FIG. 7 shows that a symmetrical inductor 71 can be wound on two magnetic cores 72a and 72b, with a bifilar winding 73 comprising two wires 72a and 72b, each center-tapped at the input voltage Vi. Again, the common-mode capacitors 4 and 5 and the symmetrical switches 42 and 43 connect and operated just as in FIG. 4.

Figure 9:
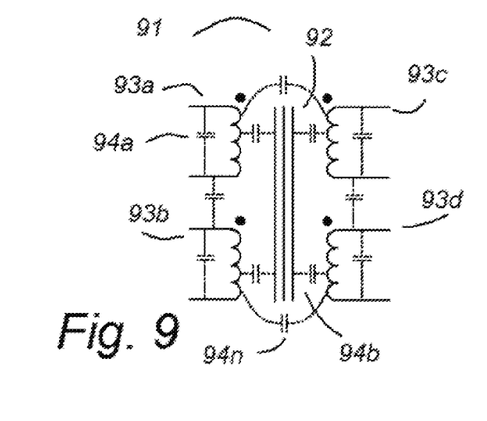
FIG. 9 shows representative stray capacitances in a conventional transformer

FIG. 9 shows a "text book" equivalent circuit of a conventional transformer 91 having a magnetic core 92 and n windings 94a through 94n, four windings being shown as an example, not a limitation. Representative stray capacitances 94a through 94n represent stray capacitances between windings and between the windings and the core. As many as are shown, it is not comprehensive. Stray capacitance is a serious problem for high frequency transformers, particularly if the voltage transitions are large.

Figure 10:
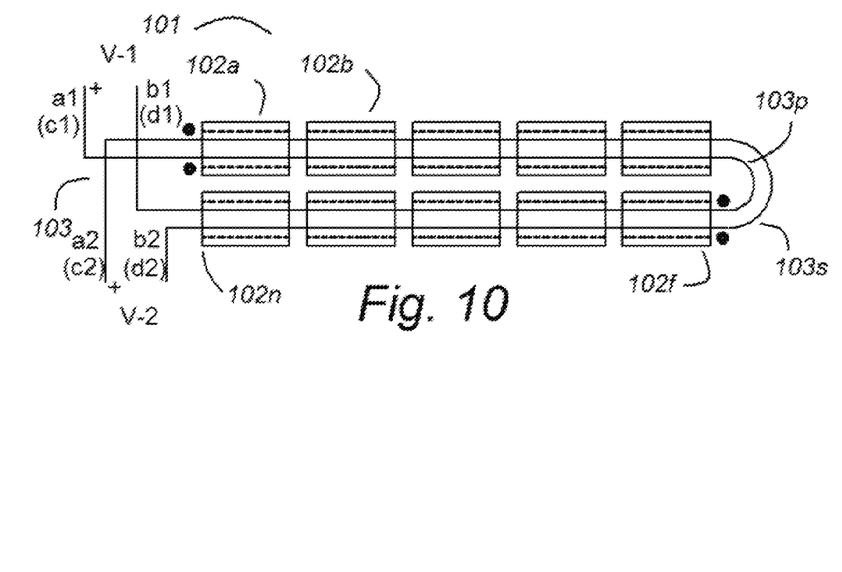
FIG. 10 shows a bead transformer having a primary turn and a secondary turn would through n cores.

FIG. 10 shows a transformer 101 comprising magnetic cores 102a through 102n, ten being shown as an example, not a limitation. The winding 103 comprises a primary winding 103 p and a secondary wining 103s, each shown as a single "U" shaped turn. The letters a1, b1, c1, d1, a2, b2, c2 and d2 label nodes to identify connection points when the transformer 101 is used in a symmetrical power converter. With reference to FIG. 4 and the discussion of FIG. 4, for the transformer 101, which has a single turn primary 103p, the nodes a and b can be connected to the nodes of the symmetrical inductor 41 having the same identifying letters a and b in FIG. 4. Alternatively, the wires can be connected to the nodes c and d of FIG. 4, as both have a suitable voltage for exciting the primary of the transformer 101.

As shown in FIG. 18 and as explained in the discussion of FIG. 18, the symmetrical inductor 41 of FIG. 4 is bi-directional, so that a second identical symmetrical inductor 41 can be used as a synchronous rectifier. The nodes a2, b2, c2 and d2 of the single turn secondary winding 103s of FIG. 10 are for showing how to connect to such a synchronous rectifier.

Figure 25:
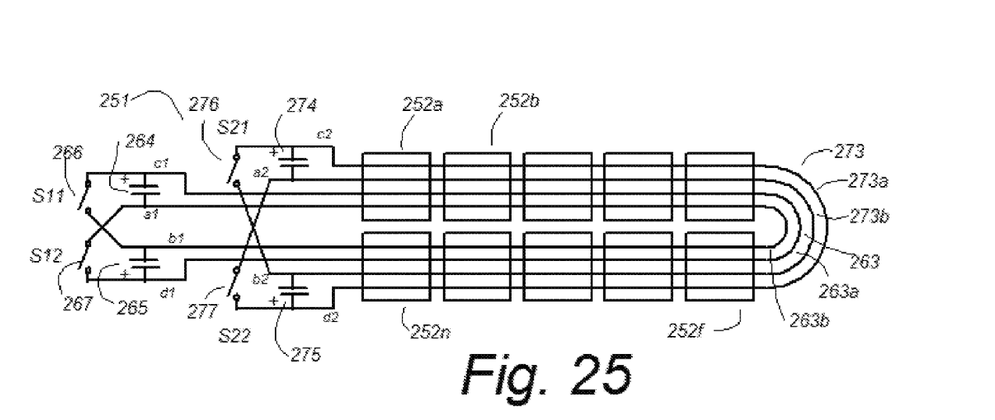
FIG. 25 shows a preferred embodiment of the symmetrical push-pull transformer with its associated primary switches, primary common-mode capacitors, secondary switches and secondary common-mode capacitors.
Figure 26:
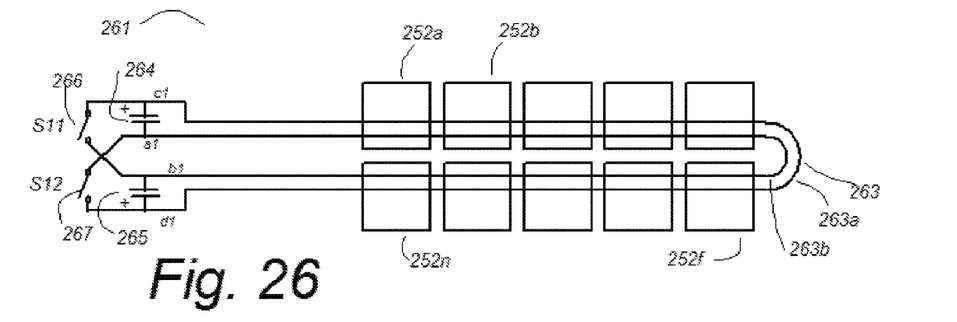
FIG. 26 shows the primary circuit of FIG. 25 alone, to show it more clearly. It has two conductors, so it can be a split primary winding.
Figure 27:
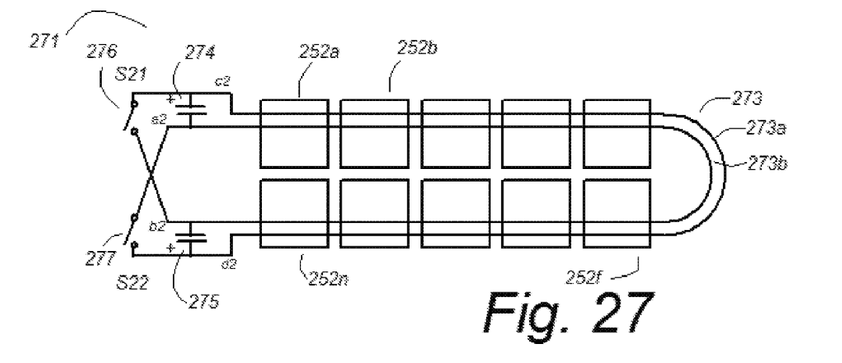
FIG. 27 shows the secondary circuit of FIG. 25 alone, to show it more clearly. It has two conductors, so it can be a split secondary winding.

FIGS. 25 through 27 show a preferred transformer 251 for use with the symmetrical inductor 41 of FIG. 4. As suggested by the same reference designators, FIG. 26 show a bifilar primary winding 263 only of the transformer 251 and the transformer 251 is designated 261 when shown this way. Likewise, FIG. 27 shows a secondary bifilar winding 273 only and the transformer 251 is designated 271 when shown this way.

Switches 42-1 and 43-1 and capacitors 264 and 265 duplicate the switches 42 and 43 and the capacitors 4 and 5 of FIG. 4. Both sets of swithes are not used; the duplication in the dashed box is for better illustration of the connections in FIGS. 25 and 26. The transformer 251 comprises magnetic cores 252a through 252n, shown as ten cores as an illustration, not a limitation. The bifilar primary winding 263 comprises two "U" shaped conductors 263a and 263b that pass through the magnetic cores 252a through 252n. The ends are designated a1, b1, c1 and d1 as nodes to show their connection to the nodes a, b, c and d of symmetrical inductor 41 of FIG. 4.

Similarly, the bifilar secondary winding 273 comprises two conductors 273a and 273b that pass through the magnetic cores 252a through 252n. The ends are designated a2, b2, c2 and d2. When the symmetrical inductor 41 of FIG. 4 is used in reverse as a synchronous rectifier, the nodes a, b, c and d are connected to the nodes designated a2, b2, c2, d2 respectively of the secondary winding 273 of FIGS. 25 and 27.

Figure 11:
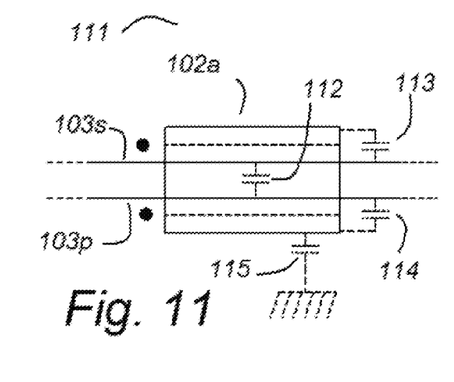
FIG. 11 shows the stray capacitance of one element of the bead transformer of FIG. 10.

FIG. 11 shows a portion 111 of the transformer 101 of FIG. 10, the core 102a with a portion of the primary winding 103p and a portion of the secondary winding 103s passing through it. FIG. 11 also shows the inter-winding stray capacitance 112 and the stray capacitances 114 and 113 between the primary winding 103p and the secondary winding 103s, respectively, to the core 102a. A shunt leakage capacitance 115 is shown from the core to the chassis. A similar stray capacitance may exist in the transformer 91 of FIG. 9 but is not shown.

An advantage of single turn primary and secondary wings is that equal voltage are induced in all winding by the changing flux, so the differential voltage between the primary winding 103p and the secondary winging 103s ideally is zero. If there is a differential voltage between the primary winding 103p and the secondary winding 103s, any current conducted through the stray inter-winding capacitance 112 is marginally helpful and not detrimental.

To the extent that there is capacitive coupling to the core 102a through the stray capacitances 113 and 114, it is common-mode and will tend to charge the shunt capacitance 115 to the chassis equally. However, it is contemplated that the core 102a will be isolated from the chassis both with insulating media and distance. To the extent that there is coupling to the core 102a, it will have no place to go.

Most magnetic cores are somewhat conductive. It would be possible to make the transformer 101 of FIG. 10 using balun type cores, but that would then establish a leakage current path between parts of the core that preferably are isolated.

Figure 14:
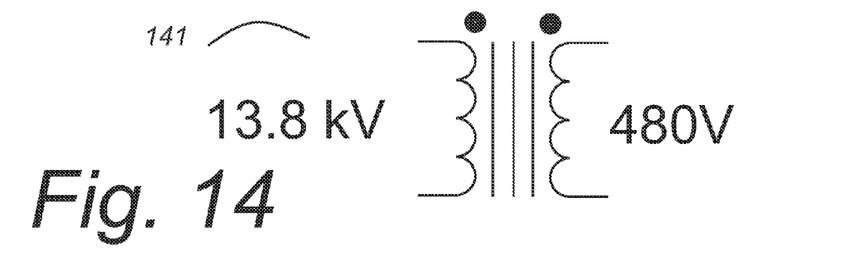
FIG. 14 shows the schematic diagram for a transformer having a high step-down ration.

FIG. 14 shows a transformer 141 shown having a primary voltage of 13.8 kV and a secondary voltage of 480 V, as an illustration, not a limitation. These are representative voltages for a medium voltage utility transformer, and some are very large, hundreds of VA or larger. The required turns-ratio is 13,800/480, or about 28.7 to 1.27 or 28 to 1 might be used, because there will be some voltage drop through the transformer. The transformer may be a "solid-state" transformer, which is the jargon of the utilities for a transformer having solid state circuitry associated with it so that the transformer itself is excited at a frequency that is much higher than line frequency, usually to accomplish a size and weight reduction.

Figure 16:
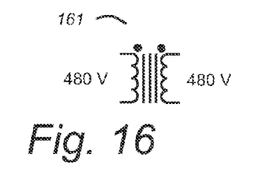
FIG. 16 shows a schematic of a transformer which may represent a "solid state dc-dc transformer."

For the reasons stated above, it is desired to use a 1 to 1 transformer, such as the transformer 161 of FIG. 16. If the transformer 161 of FIG. 16 is a "solid state" transformer, it may have the components shown in FIG. 18. The solid state transformer 181 comprises a high frequency transformer 182 that preferably is a single turn, 1 to 1 transformer as shown in FIG. 10. Primary switches 183 provide the excitation for the transformer 182, and preferably are symmetrical switches 42 and 43 of FIG. 4.

A similar switching circuit can be used for the rectifier 184. An advantage of a 1 to 1 solid state transformer module is that it can be designed for bidirectional current flow, and the same voltages and currents are present in the primary and secondary circuits, so similar components can be used. The circuit becomes symmetrical about the transformer 182.

An input filter 185 filters the noise from the switching circuit 183, and preferably is a symmetrical inductor as shown in FIGS. 1 through 4. Most power converters have an input filter capacitor, such as the input filter capacitor 187 of FIG. 18.

Preferably, the solid state transformer 181 has an output filter 186 and an output capacitor 188 that are the same as the input filter 183 and the input capacitor 187 so that common parts can be used.

The transformer 182 can have any turns-ratio to use this invention. However, a transformer 182 having a single turns for the primary and for the secondary (1 to 1) is the preferred embodiment for high frequency operation.

Figure 15:
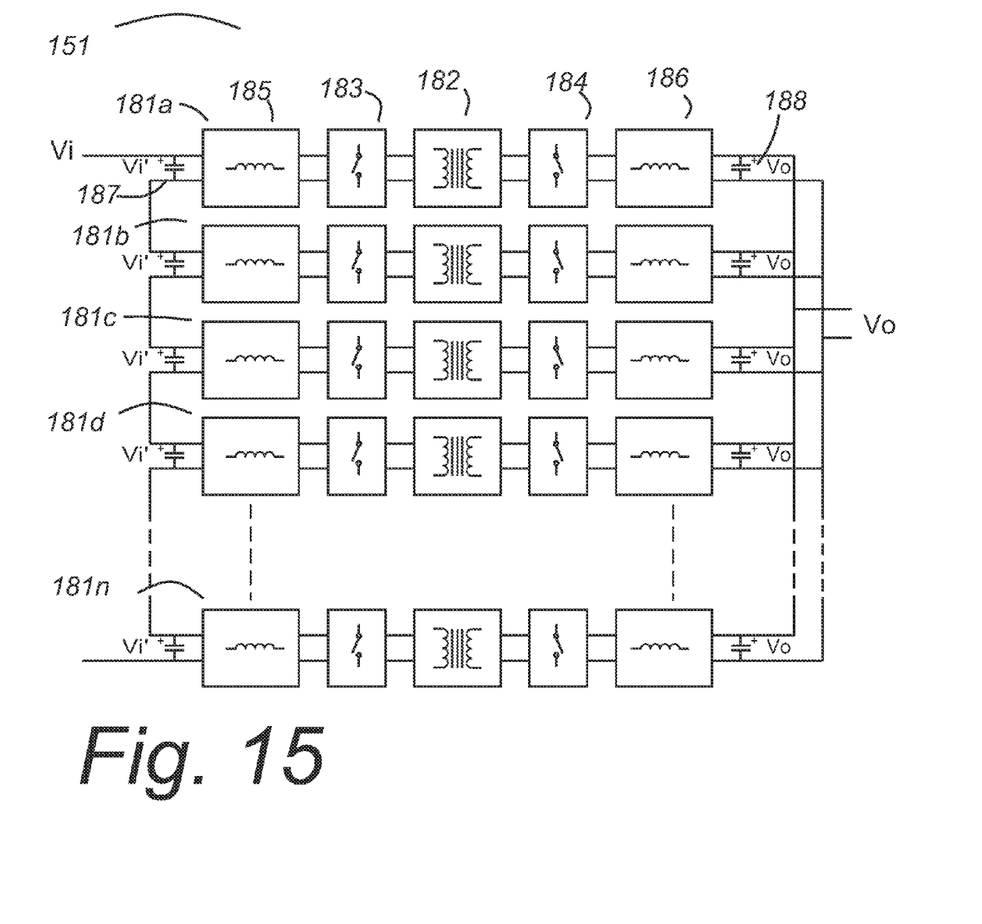
FIG. 15 shows how to make a modular symmetrical power converter having a high step-down ratio using n identical modules with 1:1 transformers.

FIG. 15 shows how n modules 181 of FIG. 18 can be stacked as an array 181a through 181n to make a symmetrical power converter 151 having a nominal input to output voltage ratio of n to 1. Each module 181a through 181n has their inputs Vi' in series and their outputs Vo in parallel. However, modules can be effectively "removed" from the symmetrical power converter 151 through electronic switching. If the switches 183 of a module are both closed, the input Vi' of that module is effectively short-circuited. Current can flow through it so that it does not impede the series current flow through the other modules, but it has no effect in that module. As this would otherwise present a zero voltage at the output Vo of that module, the rectifier switches 184 must both remain open. In this manner the effective ratio of the symmetrical power converter 151 is reduced by 1, to n−1 to 1. Additional modules can similarly be "removed" so that the effective ratio can be any n or any integer value less than n.

The switching of modules in or out of the symmetrical power converter 151, can be modulated so that non-integer ratios can be achieved as well. Note, though, that when both switches are closed, the common-mode capacitors and any input filter capacitor are short circuited. With reference to FIG. 4, if S1 42 and S2 43 are both closed, the common-mode capacitors 4 and 5 as well as the input capacitor 6 are all short circuited. This results in significant loss each time that it is done, so it should not be done frequently. In power converters that are configured for line frequency ac input, an opportune time to adjust the effective turns-ratio of the symmetrical power converter 151 of FIG. 15 would be at zero crossing of the voltage.

If the symmetrical power converter 151 of FIG. 15 is used with a very high input voltage, it will be noted that the voltage from the primary to the secondary winding of the first module must withstand the high voltage input voltage as its working voltage. For 13.8 kV ac rms, that is nearly 20,000 volts peak. To allow for voltage regulation, transients, aging and so forth, the design dielectric needs to be much higher, perhaps in the order of 50,000 volts. Although each module could be custom-designed with progressively lower dielectric requirements depending upon its position in the stack, it is preferred that one design be used for all. They are then balanced and one part can be stocked and used to replace any module for repair.

Figure 12:
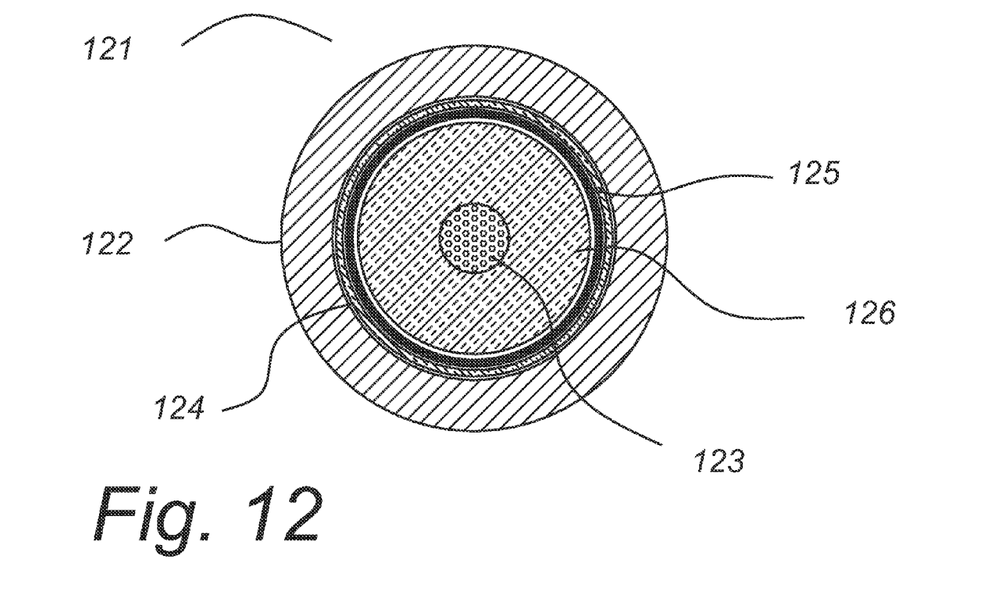
FIG. 12 shows a section through a coaxial transformer having a primary turn and a secondary turn. The very thick insulation is for high dielectric withstanding voltage.

FIG. 12 shows a cross section of a transformer core 121, which could, as an example, not a limitation, be any core 102a through 102n of the transformer 101 of FIG. 10. A primary winding 123 passes through the center of a toroidal magnetic core 122. The primary winding 123 may be Litz wire, to optimize the transformer for high frequency operation. The primary winding is then surrounded by a very thick primary insulation 126, which may comprise several layers of the same or different composition as a trade-off of the design. Surrounding that is a coaxial secondary winding 125. The secondary winding could be Litz wire as well, perhaps braided, but it is contemplated that a solid tube may be used, as the larger diameter gives it an increased surface area, so even with penetration depth effects, conduction should be sufficient. With the coaxial structure, proximity effects are not as important.

Outside the coaxial secondary winding is a core insulator 124, which, optionally, can be an insulating coating on the magnetic core 122 itself. Note that the secondary winding is lower voltage, so this insulation can be much thinner.

Figure 13:
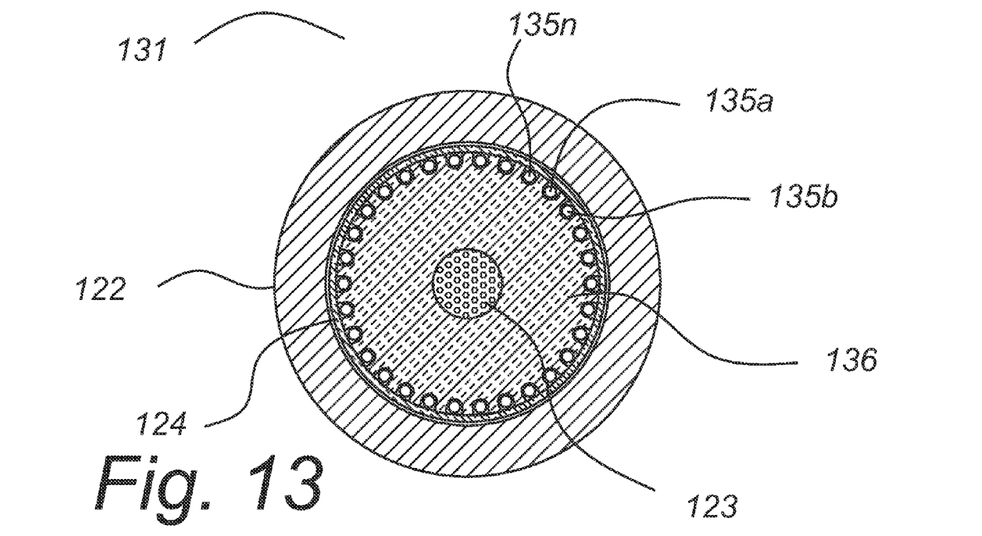
FIG. 13 shows a section through a coaxial transformer having a primary turn and a plurality of secondary windings. It is contemplated that the secondary windings would be paralleled in two groups to make a split secondary winding.

FIG. 13 shows a cross section of a transformer core 131, which could, as an example, not a limitation, be any core 102a through 102n of the transformer 101 of FIG. 10. FIG. 13 shows a variant of the transformer cross-section adapted to use a split secondary winding. A plurality of wires 135a through 135n are used in place of the solid secondary winding 135 of FIG. 12. In theory, n wires could make a transformer having n single turn secondaries, but it is contemplated that they would be terminated as two groups of n/2 windings to make n split secondary windings.

Figures 28, 29, 30:
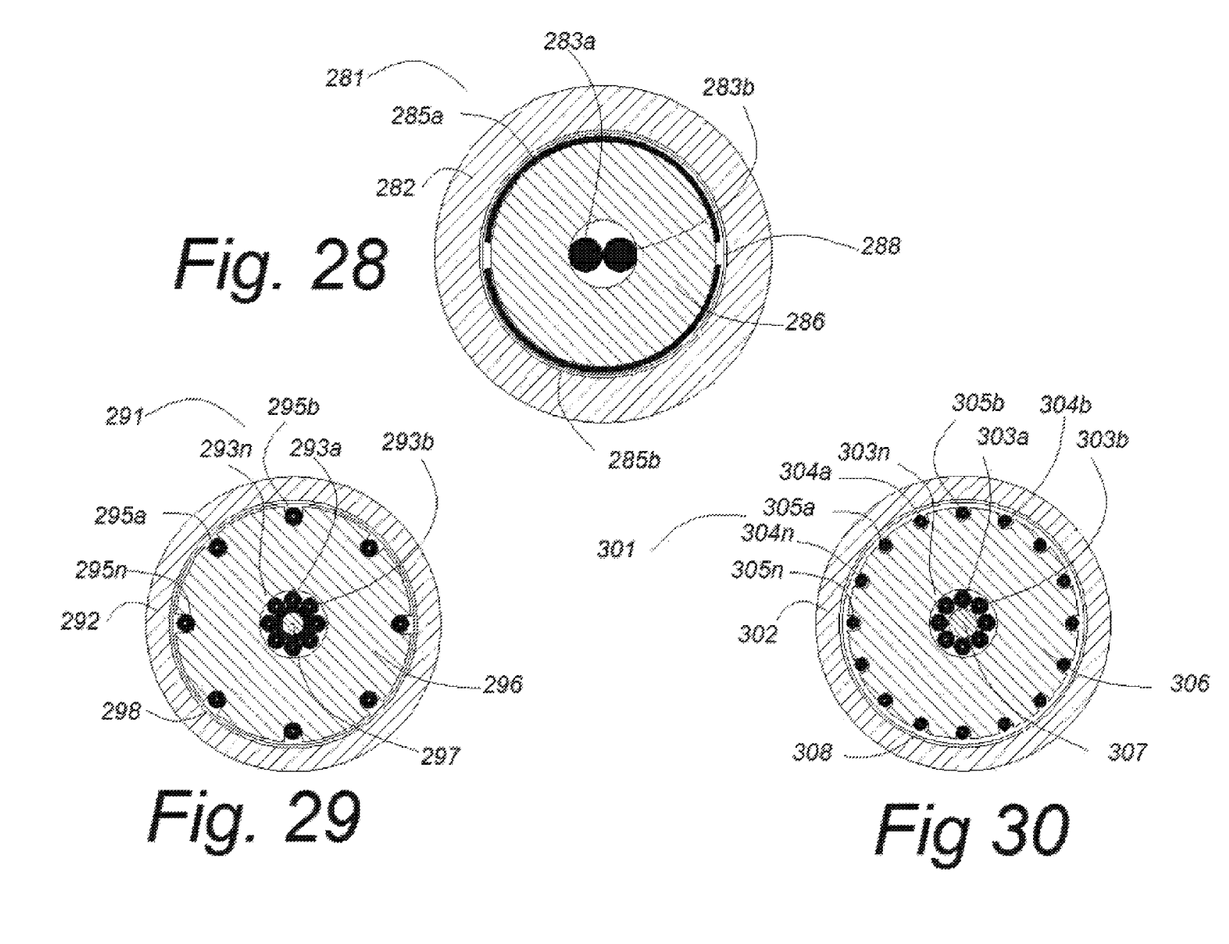
FIG. 28 shows a section of a high voltage transformer, similar to that of FIG. 12 except that there are two primary conductors in the center and two secondary conductors around the periphery.
FIG. 29 shows a section of a high voltage transformer, similar to that of FIG. 28 except that there are eight primary conductors clustered in the center and eight secondary conductors around the periphery.
FIG. 30 shows a section of a high voltage transformer, similar to that of FIG. 28 except that there are 16 secondary conductors which could be connected to be the equivalent of a split secondary winding.

The primary winding 123 also could comprise parallel wires to make a split primary as shown in FIGS. 28, 29 and 30. Although the primary winding needs to have very high dielectric withstanding voltage to the secondary, two halves of a split primary need to be insulated only for the working voltage within the primary, which is much lower.

FIG. 28 shows a cross section of a transformer core 281, which could, as an example, not a limitation, be any core 102a through 102n of the transformer 101 of FIG. 10. In FIG. 28 two primary conductors 283a, 283b are used in place of the solid primary winding 123 of FIG. 12. Two primary conductors are shown as an illustration, not a limitation. Two secondary conductors 285a, 285b are used in place of the single secondary winding 125 of FIG. 12. Each is nearly a semicircle with a small gap between them for dielectric separation. Two secondary conductors are shown as an illustration, not a limitation. The two primary windings 283a, 283b and the two secondary conductors 285a, 28bn are separated by a high voltage insulation 286. A magnetic core 282 surrounds the respective primary and secondary conductors and may be insulated from the secondary conductors by a secondary insulator 288.

FIG. 29 shows a cross section of a transformer core 291, which could, as an example, not a limitation, be any core 102a through 102n of the transformer 101 of FIG. 10. In FIG. 29 a plurality of primary conductors 293a through 293n are used in place of the solid primary winding 123 of FIG. 12. Eight primary conductors are shown as an illustration, not a limitation. A plurality of secondary conductors 295a through 295n are used in place of the single secondary winding 125 of FIG. 12. Eight secondary conductors are shown as an illustration, not a limitation. The plurality of primary windings 293a through 293n and the plurality of secondary conductors 295a through 295n are separated by a high voltage insulation 296. The plurality of primary conductors 293a through 293n may have a core 297 of insulating material to help locate the plurality of primary conductors 293a through 293n in a circular arrangement as shown, as an illustration, not a limitation. A magnetic core 292 surrounds the respective primary and secondary conductors and may be insulated from the secondary conductors by a secondary insulator 298.

FIG. 30 shows a cross section of a transformer core 301, which could, as an example, not a limitation, be any core 102a through 102n of the transformer 101 of FIG. 10. In FIG. 30 a plurality of primary conductors 303a through 303n are used in place of the solid primary winding 123 of FIG. 12. Eight primary conductors are shown as an illustration, not a limitation. A plurality of first secondary conductors 304a through 304n and a plurality of second secondary conductors 305a through 305n are used in place of the single secondary winding 125 of FIG. 12. Eight first secondary conductors and eight second secondary conductors are shown as an illustration, not a limitation. The plurality of primary windings 303a through 303n are separated from the plurality of first secondary conductors 304a through 304n and the plurality of second secondary conductors 305a through 305n by a high voltage insulation 306. The plurality of primary conductors 303a through 303n may have a core 307 of insulating material to help locate the plurality of primary conductors 303a through 303n in a circular arrangement as shown, as an illustration, not a limitation. A magnetic core 302 surrounds the respective primary and secondary conductors and may be insulated from the secondary conductors by a secondary insulator 308.

Figure 17:
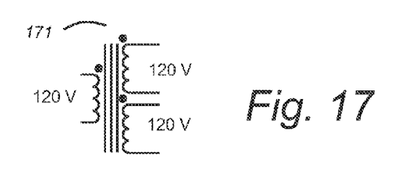
FIG. 17 shows a schematic of a transformer which may represent a "solid state dc-dc transformer" having a split secondary.
Figure 19:
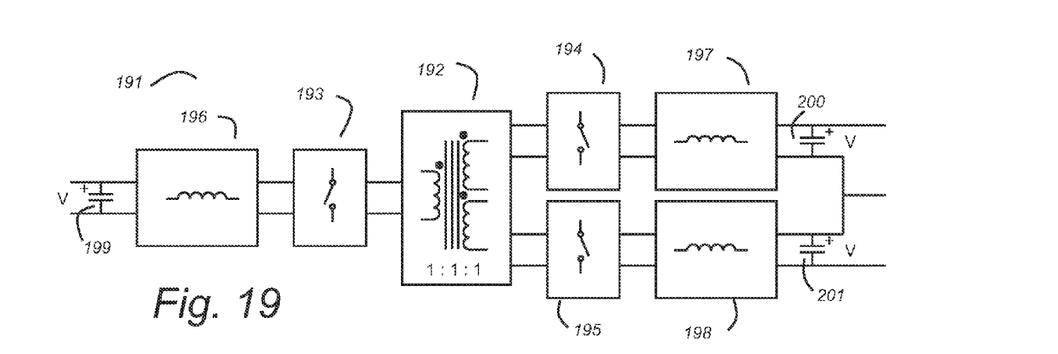
FIG. 19 shows a block diagram of the parts for the "solid state dc-dc transformer" of FIG. 17.

FIG. 17 shows a transformer 171 having a split secondary as might be used for domestic power in the United States, 120/240 V ac rms split phase. FIG. 19 shows how such a transformer can be incorporated into a symmetrical power converter module 191 of this invention. A transformer 192 having a split secondary winding has a primary switching circuit 193 to provide excitation to the transformer 192. Two separate rectifier circuits 194 and 195 respectively rectify the outputs of the transformer 192, and separate output filters 197 and 198 attenuate noise from the respective rectifying circuits 194 and 195. There are two separate output filter capacitors 200 and 201. Isolation is maintained through the secondary circuits until the final output, where they can be connected in series if desired, as shown.

An input filter 196 filters noise from the switching circuit 193, and there is an input filter capacitor 199. The symmetric power converter module 191 can be incorporated into a stacked symmetric power converter as in FIG. 15, replacing the symmetric power converter modules 181a through 181n.

Figure 20:
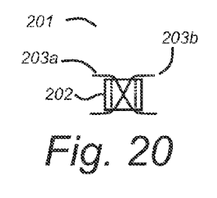
FIG. 20 shows a coupled inductor.

A preferred control mode for the symmetric power converter module is as a dual-active-bridge (dab). This requires some series inductance in the transformer circuit, and often the leakage and stray inductance of the transformer is used for this purpose. Schematically, the stray and leakage inductance may be shown as a separate inductor in series with an ideal transformer, and that can be one interpretation of the transformers 211 of FIG. 21 and 221 of FIG. 22. However for better parametric control it may be preferred to use a transformer with very low stray and leakage inductance with separate actual inductor components. The inductance required tends to be small, so the inductor 201 of FIG. 20 may be suitable. It comprises a magnetic core 202, and the transformer leads 203a and 203b pass through it.

Figure 21:
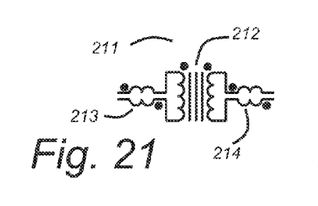
FIG. 21 shows a transformer with series inductors for a dual-active-bridge implementation of the symmetrical power converter module of FIG. 18.
Figure 22:
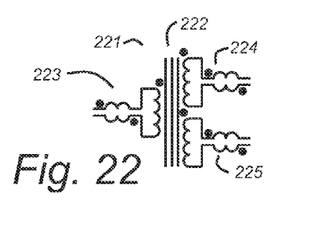
FIG. 22 shows a transformer with series inductors for dual-active-bridge implementation of the symmetrical power converter of FIG. 19.

FIG. 21 shows a transformer 212 having small inductors 213 and 214 respectively in series with its primary and secondary windings. FIG. 22 shows a transformer circuit 221, which is similar for a circuit needing a split secondary. The transformer 222 has small inductors 223, 224 and 225 on its respective primary and split secondary windings.

In theory, a dab circuit needs only one inductor, but it is preferred to maintain symmetry. In the case of the transformer circuit 221 of FIG. 22, if the secondary inductors 224 and 225 are included, the secondaries can be separately controlled for voltage regulation over some range of voltage. A dual-active-bridge circuit and its method of control are not novel, but using them is a preferred embodiment of the invention for many applications.

Figure 23:
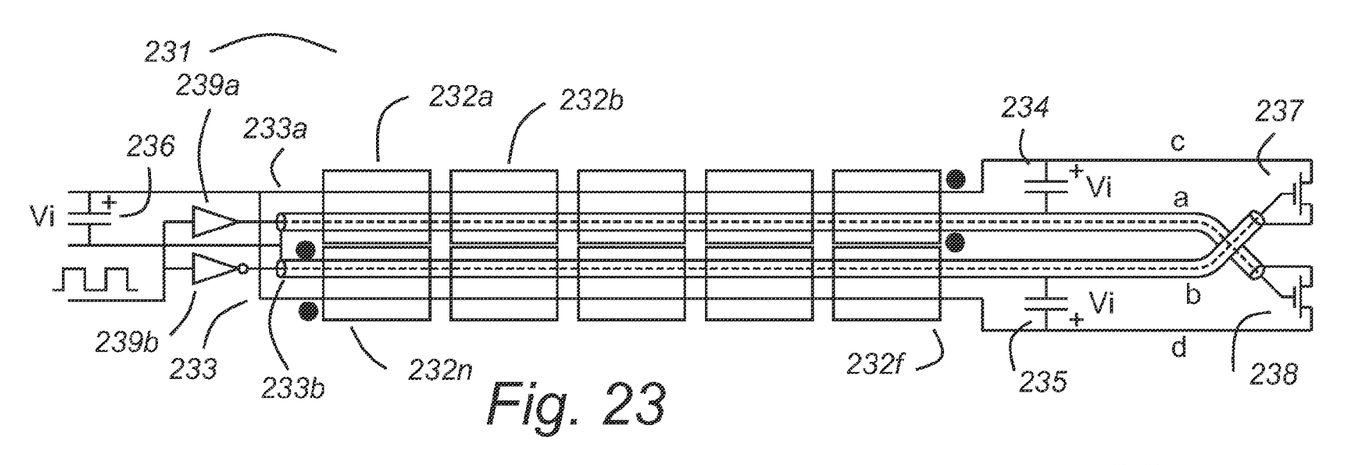
FIG. 23 shows a symmetrical inductor with capacitor switching using MOSFETs. It also shows driving the MOSFETs from ground referenced logic and drivers exploiting the common mode voltage of the symmetrical inductor windings.

In operation, the symmetrical inductor 231 of FIG. 23 is the same as the symmetrical inductor 41 of FIG. 4. However, MOSFETs 237 and 238 replaces the switches S1 41 and S2 43. The symmetrical inductor 231 comprises a plurality of magnetic cores 232a through 232n and a bifilar winding 233 comprising a high side winding 233a and a low side winding 233b. Just as in FIG. 4, there are common-mode capacitors 234 and 235, and an input capacitor 236.

The sources of the MOSFETs have voltages that vary substantially throughout the switching cycle, as can be seen by reference to the voltage on nodes a and b in FIGS. 8a and 8b. One skilled in the art of power converters would know how to provide to provide a suitable gate drive, but the complexity of the gate drive is greatly simplified if the common-mode voltage through the transformer cores 233a through 232n is utilized. To do so, the low side winding 233b comprises hollow conductors with the gate drives passing through them. Buffer-drivers 239a and 239b provide the necessary gate drives. The advantage of this arrangement is that the buffer-drivers and their logic can be referenced to the low side of the input power Vi.

If used in a symmetrical power converter such as the symmetrical power converter 151 of FIG. 15, the low side of the respective voltage inputs Vi' may be at elevated voltage, maybe even thousands of volts, but the voltage does not change over the switching cycle.

Figure 24:
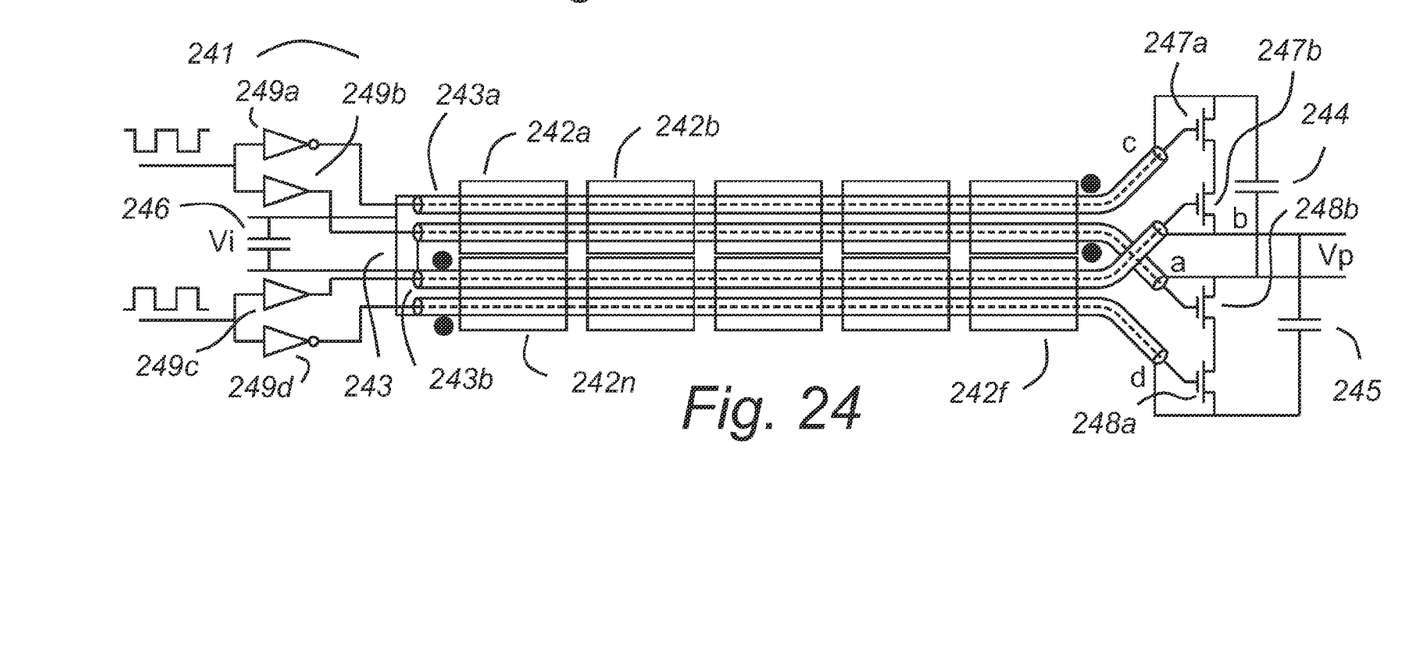
FIG. 24 shows how to modify the symmetrical power converter module of FIG. 23 for alternating voltage on its input by using "back-to-back" MOSFET as ac switches.

FIG. 24 shows a symmetrical inductor 241 which also is similar to the switching inductor 41 of FIG. 4, except that the switches S1 42 and S2 43 have been replaced with back to back MOSFETs 247a, 247b, 248a and 248b. The symmetrical inductor 241 comprises a plurality of magnetic cores 242a through 242n and a bifilar winding 243 comprising a high side winding 243a and a low side winding 243b. Just as in FIG. 4, there are common-mode capacitors 244 and 245, and an input capacitor 246.

As in FIG. 23, buffer-drivers 249a, 249b, 249c and 249d provide gate drives for the respective MOSFETs, and as in FIG. 23, the common-mode voltage through the magnetic cores 242a through 242n is utilized. In operation, for one polarity of input voltage, MOSFETs 247b and 248b are switched, while MOSFETs 247a and 247b are turned on continuously, and operation is just as in FIG. 23. If the input voltage changes polarity, then MOSFETs 247a and 248a are switched, and MOSFETs 247b and 248b are turned on continuously.

Neither using the common-mode through the transformer as in FIGS. 23 and 24 nor the used of back to back MOSFETs to switch voltage that reverses polarity are novel, but they are presented as the preferred embodiment of the invention for some applications.

The invention claimed is:

1. A bidirectional symmetrical power converter comprising a bifilar winding having a start, a center-tap and an end comprising
  a first conductor and a second conductor,
    the start of the first conductor being node a,
    the center-tap of the first conductor being node e,
    the end of the first conductor being node b,
    the start of the second conductor being node c,
    the center-tap of the second conductor being node f,
    the end of the second conductor being node d,
  the bifilar winding being wound through at least a first magnetic core;
the bidirectional symmetrical power converter further comprising
  a first input comprising node f and node e, a second input comprising node a and node b, and
a third input comprising om node c and node d;
the bidirectional symmetrical power converter further comprising
first and second common mode capacitors,
the first common mode capacitor being connected from node a to node c,
the second common mode capacitor being connected from node b to node d,
first and second switches,
the first switch being connected from node a to node b,
the second switch being connected from node c to node d;
the bidirectional symmetrical power converter having at least first and second modes of operation,
in the first mode of operation, the bidirectional symmetrical power converter receives a voltage on the first input and by alternately switching the first switch and the second switch produces first and second square-wave voltages, respectively, on the second and third inputs,
the first and second square-wave voltages having peak to peak magnitudes equal to the voltage on the first input
and
in the second mode of operation, the bidirectional symmetrical power converter receives a square-wave voltage from at least one of the second input and the third input and by alternately switching the first switch and the second switch produces a voltage on the first input equal to the peak to peak magnitude of the square-wave voltage of the at least one of the second input and the third input.

2. The symmetrical power converter of claim 1 wherein the least a first magnetic core comprises a plurality of magnetic cores with the bifilar winding wound through all of the plurality of magnetic cores in series.

3. The symmetrical power converter of claim 1 wherein the first and second switches are first and second semiconductor switches.

4. The symmetrical power converter of claim 3 wherein the first and second semiconductors switches are back-to-back MOSFETs,
to allow operation with an input voltage of positive and negative polarity and alternating polarity.

5. An isolated bidirectional symmetrical power converter comprising
a first bidirectional symmetrical power converter designated L1 and comprising
a bifilar winding of L1 having a start, a center-tap and an end comprising
a first conductor of L1 and a second conductor of L1,
the start of the first conductor of L1 being node a1,
the center-tap of the first conductor of L1 being node e1,
the end of the first conductor of L1 being node b1,
the start of the second conductor of L1 being node c1,
the center-tap of the second conductor of L1 being node f1,
the end of the second conductor of L being node d1,
the bifilar winding of L1 being wound through at least a first magnetic core of L1;
the first bidirectional symmetrical power converter L1 further comprising
a first input of L1 comprising node f1 and node e1,
a second input of L1 comprising node a1 and node b1, and
a third input of L1 comprising node c1 and node d1;
the first bidirectional symmetrical power converter L1 further comprising
first and second common mode capacitors of L1,
the first common mode capacitor of L1 being connected from node a1 to node c1,
the second common mode capacitor of L1 being connected from node b1 to node d1,
first and second switches of L1,
the first switch of L1 being connected from node a1 to node b1,
the second switch of L1 being connected from node c1 to node d1;
the isolated bidirectional symmetrical power converter further comprising
a second bidirectional symmetrical power converter designated L2 comprising
a bifilar winding of L2 having a start, a center-tap and an end comprising
a first conductor of L2 and a second conductor of L2,
the start of the first conductor of L2 being node a2,
the center-tap of the first conductor of L2 being node e2,
the end of the first conductor of L2 being node b2,
the start of the second conductor of L2 being node c2,
the center-tap of the second of L2 conductor being node f2,
the end of the second conductor of L2 being node d2,
the bifilar winding of L2 being wound through at least a first magnetic core of L2;
the second bidirectional symmetrical power converter L2 further comprising
a first input of L2 comprising node f2 and node e2,
a second input of L2 comprising node a2 and node b2, and
a third input of L2 comprising node c2 and node d2;
the second bidirectional symmetrical power converter L2 further comprising
first and second common mode capacitors of L2,
the first common mode capacitor of L2 being connected from node a2 to node c2,
the second common mode capacitor of L2 being connected from node b2 to node d2,
first and second switches of L2,
the first switch of L2 being connected from node a2 to node b2,
the second switch of L2 being connected from node c2 to node d2;
the isolated bidirectional symmetrical power converter further comprising a transformer designated T,
the transformer T comprising
a first bifilar winding of T having a start and an end,
the first bifilar winding of T comprising a first conductor of T and a second conductor of T
the start of the first conductor of T being connected to node a1
the end of the first conductor of T being connected to node b1
the start of the second conductor of T being connected to node c1
the end of the second conductor of T being connected to node d1
the transformer T further comprising
a second bifilar of T winding having a start and an end the second bifilar winding of T having a third conductor of T and a fourth conductor of T,
the start of the third conductor of T being connected to node a2
the end of the third conductor of T being connected to node b2
the start of the fourth conductor of T being connected to node c2
the end of the fourth conductor of T being connected to node d2
the first bifilar winding of T and the second bifilar of T winding being wound through at least a first magnetic core of T,
the isolated bidirectional symmetrical power converter having at least first and second modes of operation,
in the first mode of operation, the isolated bidirectional symmetrical power converter receives a voltage on the first input of L1 and by alternately switching the first switch of L1 and the second switch of L1 produces first and second square-wave voltages of L1, respectively, on the second and third inputs of L1,
the first and second square-wave voltages of L1 having peak to peak magnitudes equal to the voltage on the first input of L1 and the bidirectional symmetrical power converter L2 receives a square-wave voltage from at least one of the second input of L2 and the third input of L2 and by alternately switching the first switch of L2 and the second switch of L2 produces a voltage on the first input of L2 equal to the peak to peak magnitude of the square-wave voltage of L2 of the at least one of the second input of L2 and the third input of L2,
whereby the transformer transforms the square-wave voltage of L1 on the second and third inputs of L1 with isolation to the second and third inputs of L2 as the square-wave voltage of L2 so that the voltage of the first input of L1 is transformed with isolation to the first input of L2, and in the second mode of operation, the isolated bidirectional symmetrical power converter receives a voltage on the first input of L2 and by alternately switching the first switch of L2 and the second switch of L2 produces first and second square-wave voltages of L2, respectively, on the second and third inputs of L2,
the first and second square-wave voltages of L2 having peak to peak magnitudes equal to the voltage on the first input of L2 and the bidirectional symmetrical power converter L1 receives a square-wave voltage from at least one of the second input of L1 and the third input of L1 and by alternately switching the first switch of L1 and the second switch of L1 produces a voltage on the first input of L1 equal to the peak to peak magnitude of the square-wave voltage of L1 of the at least one of the second input of L1 and the third input of L1,
whereby the transformer transforms the square-wave voltage of L2 on the second and third inputs of L2 with isolation to the second and third inputs of L1 as the square-wave voltage of L1 so that the voltage of the first input of L2 is transformed with isolation to the first input of L1.

6. The symmetrical power converter of claim 5 further comprising at least one of a first dual active bridge inductor connected in series with the the first bifilar winding of T of the transformer and a second dual active bridge inductor connected in series with the second bifilar winding of T of the transformer so that the isolated bi-directional symmetrical power converter can be controlled as a dual active bridge power converter.

* * * * *